United States Patent [19]
Attwell

[11] Patent Number: 4,735,168
[45] Date of Patent: Apr. 5, 1988

[54] METHOD AND APPARATUS FOR APPLYING A LINING MATERIAL TO A CONDUIT

[76] Inventor: Ronald L. Attwell, "Horizon", Brittas Bay, County Wicklow, Ireland

[21] Appl. No.: 880,690

[22] Filed: Jul. 1, 1986

[51] Int. Cl.⁴ .............................................. B31B 1/00
[52] U.S. Cl. .................................. 118/306; 118/215; 118/DIG. 10
[58] Field of Search ............... 118/317, 306, 214, 215, 118/DIG. 10; 417/476, 477; 604/185, 151

[56] References Cited
U.S. PATENT DOCUMENTS

| | | | |
|---|---|---|---|
| 3,039,428 | 6/1962 | McLean | 118/306 X |
| 3,327,898 | 6/1967 | Farr | 417/476 X |
| 3,987,963 | 10/1976 | Pacht | 118/306 X |
| 4,216,738 | 8/1980 | Muta | 118/306 X |
| 4,233,928 | 11/1980 | Hara et al. | 118/306 X |
| 4,368,219 | 1/1983 | Nagata et al. | 118/306 X |
| 4,380,236 | 4/1983 | Norton | 417/476 X |

*Primary Examiner*—David Simmons
*Attorney, Agent, or Firm*—Scully, Scott Murphy & Presser

[57] ABSTRACT

Apparatus for applying a lining material to a conduit comprises an elongate flexible pipe for lining material. A dispensing nozzle is provided at one end of the pipe and the other end of the pipe is squeezed between a pair of driven rollers to expel the lining material through the dispensing nozzle as the pipe is drawn through the conduit. A pair of circular steel wire brushes are mounted on the pipe below the dispensing nozzle center the pipe in the conduit and also clean the side wall of the conduit ahead of the nozzle. The cross-sectional area of the pipe is calculated so that as the pipe is pulled back down the conduit it deposits an evenly distributed, predetermined amount of lining material on the side wall of the conduit.

23 Claims, 4 Drawing Sheets

METHOD AND APPARATUS FOR APPLYING A LINING MATERIAL TO A CONDUIT

BACKGROUND TO THE INVENTION

The invention relates to a method of applying a lining material to a conduit and in particular but not exclusively to a method of applying a lining material to a pipe or a chimney flue. The invention also relates to an apparatus for applying a lining material to a conduit.

Conduits such as sewer or water pipes are generally relined with cement using a spraying system. One problem with such known methods, however, is that it is difficult to maintain a regular thickness of sprayed material. This is particularly the case with sewer or water pipes which are less then one meter in diameter.

The use of solid fuel appliances has accelerated the deterioration of chimney flues in domestic dwellings. In many cases domestic chimney flues built over the last century and made redundant during the period of cheap oil are now being brought back into use and it is generally necessary to re-line the flues of these chimneys in order to meet appropriate standards.

One known method of relining the flues of such chimneys is to thread a flexible stainless steel or galvanised pipe through the existing flue. This is a difficult and time consuming operation particularly when trying to accommodate bends in the chimney. In addition, stainless or galvanised steel are no longer acceptable materials as they do not meet the standards required for solid fuel chimneys.

It is also known to re-line a flue with a non-combustible light-weight cement by first inserting a flexible inflatable core into the flue, usually from the top, and then pumping or pouring wet mixed lining material around the core. This method normally requires acess to the top of the chimney and it may take at least twenty-four hours for the lining material to set before the core can be removed. Thus, two visits to the chimney site are normally required, one for carrying out the lining operation and the other to remove the core. In addition, because of its light-weight character the lining material in this case must be applied in a thick layer which presents difficulties of adhesion and the lining material generally occupies an excessive proportion of the designed cross sectional area which reduces the efficiency of the flue.

In both the prior art relining methods described it is difficult to maintain a rectangular cross-section which is used in many chimneys.

OBJECTS OF THE INVENTION

This invention is directed towards providing a relatively simple, cheap and efficient method of applying a lining material to a conduit which will overcome the problems with known methods. The invention is also directed towards providing an apparatus for use in applying a lining material.

SUMMARY OF THE INVENTION

According to the invention there is provided a method of applying a lining material to a conduit, the lining material being contained in a pipe having a flexible side wall portion and having a lining material dispensing means at one end, the method comprising the steps of:
inserting the pipe into a conduit to be lined, squeezing the flexible side wall portion of the pipe at a squeezing location adjacent another end of the pipe while drawing the pipe through the conduit to expel material through the dispensing means and onto the conduit, the amount of lining material being deposited on the conduit being proportional to the volume of the pipe at the squeezing location and independent of the speed of travel of the dispensing means relative to the conduit.

Preferably the method includes the step of:
pressurizing the pipe prior to insertion of the pipe into the conduit.

In one embodiment of the invention the pipe is pressurized by filling it with a lining material.

In another embodiment of the invention the method includes the step of:
cleaning the conduit side wall ahead of the dispensing means as the pipe is being drawn through the conduit. The conduit side wall may be cleaned by brush means or a spray head located ahead of the dispensing means as the pipe is drawn through the conduit. The spray head may also be used to apply a sealant or primer material prior to applying the lining material.

In one embodiment of the invention the side wall portion of the pipe is squeezed by a pair of squeezing elements. The squeezing elements may for example comprise a pair of rollers namely a top roller and a bottom roller. Either or both of the rollers may be driven rollers. Typically the pipe is drawn through the conduit by the rollers.

In one embodiment of the invention the conduit is of substantially uniform transverse cross-sectional area over its length and the pipe is also of substantially constant transverse cross-sectional area over its working length for deposition of a substantially uniform layer of lining material. In another embodiment of the invention the conduit is of variable cross-sectional area over its length and the pipe is proportionately variable in cross-section over its length, the location of increased or reduced cross-sectional area of the pipe lying at the squeezing location of the nozzle is aligned with the location of the corresponding change in cross-sectional area of the conduit for deposition of a substantially uniform layer of lining material.

When the conduit is a flue the pipe may be inserted into the flue from below.

In another aspect the invention provides an apparatus for applying a lining material to a conduit comprising a pipe for lining material, the pipe having a side wall portion of a flexible material and having a dispensing means adjacent one end, means for centering the pipe in the conduit, and means for squeezing the pipe to expel material through the dispensing means as the pipe is drawn through the conduit.

In one embodiment of the invention the means for squeezing the pipe comprises a pair of squeezing elements.

Typically the squeezing elements comprise a pair of driven rollers namely a top roller and a bottom roller or a plurality of top and bottom rollers any combination or all of which may be driven. Usually, the rollers also draw the pipe through the conduit. The top roller may be pivotally mounted.

In one embodiment of the invention the pipe is of substantially uniform cross-sectional area over its length for deposition of lining material on a conduit of substantially uniform cross-sectional area overs its length.

In an alternative embodiment of the invention the cross-sectional area of the pipe is variable over its length in proportion to a change in cross-sectional area of the conduit, the location of increased or reduced cross-sectional area of the pipe lying at the squeezing location as the nozzle is aligned with the location of the corresponding change in cross-sectional area of the conduit.

In a further embodiment of the invention the apparatus includes means for cleaning the conduit ahead of the nozzle. Ideally the means for cleaning the conduit provides the centering means. Cleaning means may for example comprise a brush or a spray such as a high pressure spray leading the dispensing means as the pipe is drawn through the conduit. The brush may be transversely extendable.

In one embodiment of the invention the conduit is a flue and the pipe is inserted into the flue from below. In this case the lining material may be an acid resistant fire rated lining material.

In one embodiment of the invention the pipe side wall section is substantially cylindrical for deposition of lining material on a conduit side wall which is also substantially cylindrical.

These features and other features, advantages and objects of the invention will become readily apparent from the following description, when taken in conjunction with the accompanying drawings.

DESCRIPTION OF PREFERRED EMBODIMENTS

Figure 1:
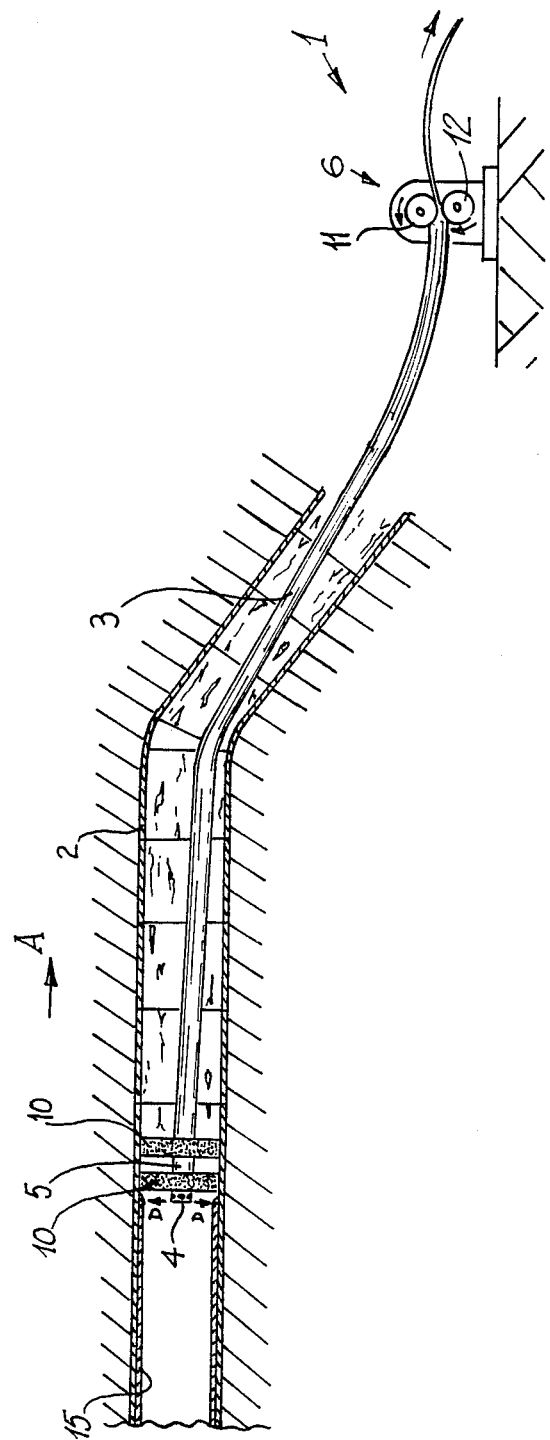
FIG. 1 is a schematic side, partly sectional view illustrating a method and apparatus for applying a lining material to a conduit.

Referring to the drawings there is illustrated an apparatus indicated generally by the reference numeral 1 for applying a lining material 7 to a conduit, in this case a section of a sewer or water pipe 2. The apparatus comprises an elongate pipe 3 of flexible material which is capable of folding flat and having a dispensing means comprising a nozzle 4 at one end 5 and means 6 for squeezing the pipe 3 at the other end to expel lining material through the nozzle 4 as the lining pipe 3 is drawn through the water pipe 2 in the direction of the arrow A in FIGS. 1 and 3.

Centering means which in this case is provided by a pair of circular steel wire brushes 10 mounted on the lining pipe 3 below the nozzle 4 are provided for retaining the lining pipe 3 in position as it is drawn through the water pipe 2. The brushes 10 also provide a means for cleaning the water pipe 2 before the lining material is applied and may be transversely extendable in operation to accommodate variations in water pipe diameter.

Figure 2:
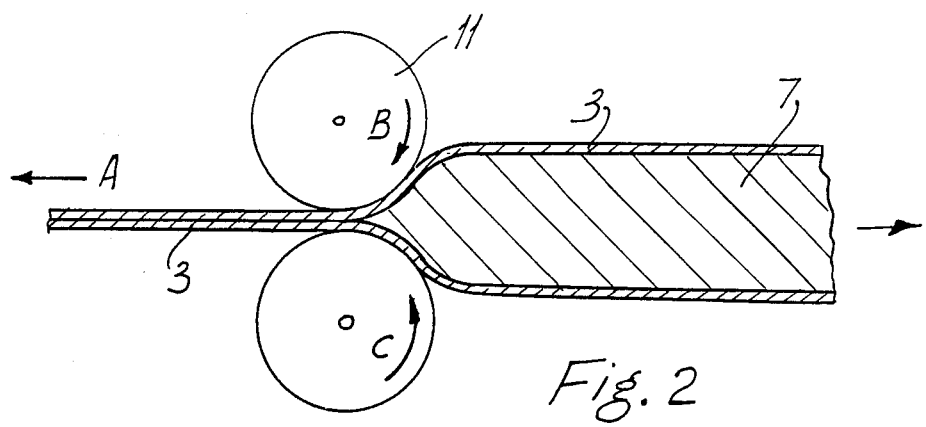
FIG. 2 is a sectional view on an enlarged scale of portion of the apparatus of FIG. 1.
Figure 4:
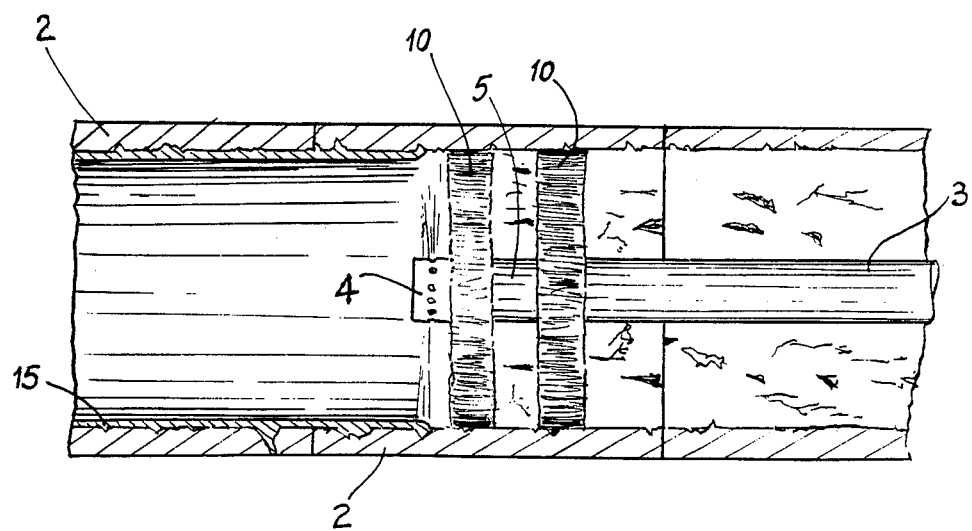
FIG. 4 is a longitudinal cross-sectional view of portion of a relined conduit.

The squeezing means 6 is provided by a pair of rollers namely a top roller 11 and a bottom roller 12 which in this case are driven in opposite directions as indicated by the arrows B and C in FIG. 2 to squeeze the side wall of the lining pipe 3 therebetween and expel lining material through the nozzle 4 as the lining pipe 3 is drawn through the water pipe 2. The top roller 11 may be pivotally mounted to facilitate tightening on the lining pipe 3 and to allow for quick release.

The nozzle 4 may be of any suitable construction and is designed to project a hollow core or shallow disc of lining material. The shape of the core or disc developed by the nozzle is of any suitable cross section such as circular or rectangular to mirror a conduit of similar cross section. The particular nozzle 4 illustrated is a stationary nozzle and comprises an end cap having a plurality of apertures 8 through which the lining material is expelled in the direction of the arrows D. It will however be appreciated that any suitable construction of nozzle may be employed, including a nozzle of the rotating type such as a spinner or a spray nozzle operated using compressed air.

Figure 3:
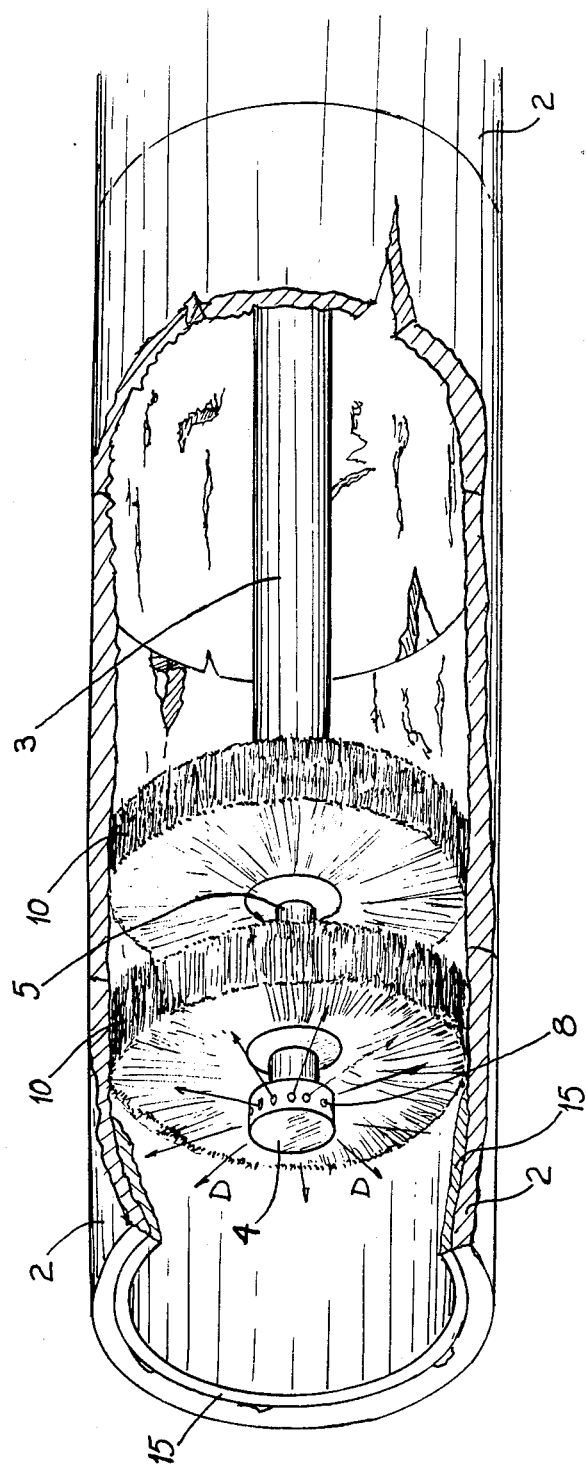
FIG. 3 is a side, perspective partially cut-away view of another portion of the apparatus of FIG. 1 on an enlarged scale.

In use, a lining material 7 is pumped into a length of lining pipe 3 sufficient to reach the end of the water pipe 2. The pipe 3 is then pumped to a pressure which ensures that it is semi-rigid and is then fed through the water pipe 2, if necessary with the assistance of flexible rods, until the nozzle 4 is adjacent the desired location in the pipe 2. The retained end of the lining pipe 3 is then passed between the rollers 11,12 which are driven to draw the lining pipe 3 through the water pipe 2 while expelling lining material through the nozzle 4. As the lining pipe 3 is drawn through the water pipe 2 a layer 15 of lining material is deposited on the pipe 2 as illustrated in FIG. 3.

The cross-sectional area of the lining pipe 3 is calculated so that as the lining pipe is pulled back through the water pipe 2 it deposits a pre-determined amount of material on the side wall of the water pipe 2. The amount of material deposited is independent of the speed of travel of the nozzle 4 relative the water pipe 2 and is proportional to the volume of the pipe 3 passing between the rollers 11,12. If the portion of pipe 3 passing through the rollers is of reduced cross-section the amount of material expelled through the nozzle 4 will be proportionately reduced. Similarly, if portion of the cross-sectional area of the lining pipe 3 is increased as this portion is passing through the rollers an increased amount of material will be expelled through the nozzle 4. Thus, the amount of material being deposited may be varied over the length of the water pipe and hence changes in cross-section of the water pipe 2, for example at bends may be accommodated.

The cross-sectional area of the water pipe 2 and lining pipe 3 are matched and the water or other pipe or conduit may be either circular as illustrated, rectangular or any shape. The cross-sectional area of the conduit may vary over its length as already mentioned and may lie substantially horizontal or may rise straight or lie at any angle to the vertical or horizontal.

The principal advantage of the invention is that it allows an old conduit such as a water pipe or sewer pipe to be cheaply and quickly and accurately re-lined without unduly reducing the conduit cross-sectional area and at the same time bringing it into conformity with appropriate standards.

In the case where the lining pipe is filled with lining material prior to insertion into the conduit an additional advantage is that the mixing of the lining material and filling of the pipe may be carried out away from the lining site. In this connection it is envisaged that it will be possible to fill the lining pipe with material away from the site and seal the pipe, for example, by vacuum sealing for application at a later date. Alternatively, the pipe may be filled away from the site with material which may be activated on site by a suitable catalyst.

It will also be appreciated that any appropriate means may be used for centering the pipe in the conduit. For example, a skid, frame, rollers or a combination of such devices may be attached to the nozzle or lining pipe. In the particular embodiment of the invention illustrated the centering means and cleaning means are circular brushes which also provide the means for cleaning the conduit leading the nozzle as the lining pipe is drawn through the conduit, however, it will be appreciated that in some cases the brushes may not be required. For example, a spray may be used to clean the conduit. Such a spray may also be used to apply a sealant or primer before re-lining.

It will be appreciated that any suitable means for squeezing the pipe may be employed. For example, two squeezing elements spaced-apart to receive the pipe therebetween may be employed. These elements need not necessarily be of the rotating type, they may for example be formed from two flat plates one or both of which could be pivotally mounted to increase the squeezing pressure and facilitate quick release. In this case a separate means may be provided for drawing the pipe down through the chimney. Alternatively, it may be pulled through the squeezing elements by hand. In the case where the squeezing means is provided by rollers, there may be a number of top and bottom rollers any combination of which or indeed all of which may be driven.

The pipe may be of any suitable material, however, it has been found that a suitably pressure-rated hose of the fold-flat type generally used as a fire-hose is suitable.

Figure 5:
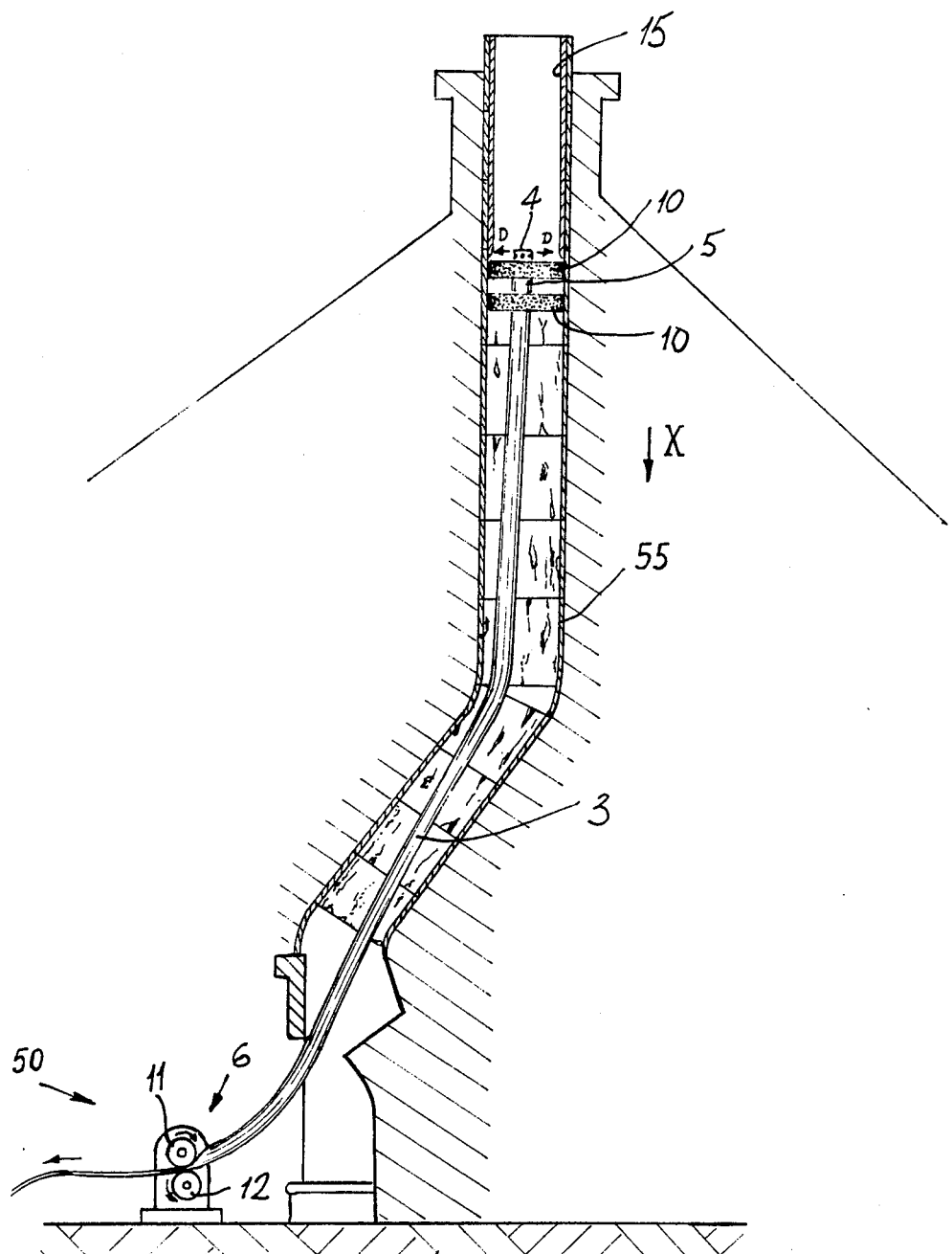
FIG. 5 is a schematic side, partially sectional view illustrating a method and apparatus for applying a lining material to a flue.

Referring to FIG. 5 there is illustrated an apparatus 50 for applying a lining material to a conduit which in this case is a chimney flue 55. The apparatus is similar to that described above with reference to FIGS. 1 to 4 and like parts are assigned the same reference numerals. In this case the lining material is an acid resistant fire-rated material and the lining pipe 3 is first inserted up through the flue 55 and then drawn downwardly, in the direction of the arrow X, through the flue.

In this case the operation of relining a conventional domestic chimney flue generally requires less than 30 minutes to complete and is completed on a single visit to the chimney site. Typically, the chimney may be used within two or three hours of application of the lining material, or as soon as the applied material has cured.

It will be appreciated that any suitable lining material may be employed. Typically the lining material will be a cementitious or plastic slurry type material such as polyester resin. In the case of polyester resin a catalyst may be injected into the nozzle.

I claim:

1. A method of applying a lining material to a conduit, the lining material being contained in a pipe having a flexible side wall portion and having a lining material dispensing means at one end, the method comprising the steps of:

inserting the pipe into a conduit to be lined; squeezing the flexible side wall portion of the pipe at a localized squeezing location adjacent another end of the pipe while drawing the pipe through the conduit by the action of said squeezing to expel material through the dispensing means and onto the conduit;

the amount of lining material being deposited on the conduit being proportional to the volume of the pipe at the squeezing location and independent of the speed of travel of the dispensing means relative to the conduit.

2. A method as claimed in claim 1 including the step of:

pressurizing the pipe prior to insertion of the pipe into the conduit.

3. A method as claimed in claim 2 wherein the pipe is pressurized by filling it with a lining material.

4. A method as claimed in claim 1 including the step of:

cleaning the conduit side wall ahead of the dispensing means as the pipe is being drawn through the conduit.

5. A method as claimed in claim 4 wherein the conduit side wall is cleaned by a brush means leading the dispensing means, as the pipe is drawn through the conduit.

6. A method as claimed in claim 4 wherein the conduit is cleaned by a spray head leading the dispensing means as the pipe is drawn through the conduit.

7. A method as claimed in claim 1 including the step of:

applying a sealant or primer material to the conduit prior to applying the lining material.

8. A method as claimed in claim 7 wherein the sealant or primer material is applied by a spray head leading the dispensing means as the pipe is drawn through the conduit.

9. A method as claimed in claim 1 wherein the squeezing step includes the step of leading the pipe between a pair of squeezing rollers which squeeze the pipe side wall to expel material through the dispensing means.

10. A method as claimed in claim 9 wherein the rollers are driven and the pipe is drawn through the conduit by the rollers.

11. A method as claimed in claim 1 wherein the conduit is of substantially uniform transverse cross-sectional area over its length and the pipe is also of substantially constant transverse cross-sectional area over its working length for deposition of a substantially uniform layer of lining material.

12. A method as claimed in claim 1 wherein the conduit is of variable cross-sectional area over its length and the pipe is proportionately variable in cross-section over its length, the location of an increased or reduced cross-sectional area of the pipe lying at the squeezing location when the nozzle is aligned with the location of the corresponding change in cross-sectional area of the conduit for deposition of a substantially uniform layer of lining material.

13. Apparatus for applying a lining material to a conduit comprising a pipe for the lining material, the pipe having a side wall portion of flexible material and having a dispensing means adjacent one end, means for centering the pipe in the conduit, and means for squeezing a localized area of the pipe to expel material through the dispensing means and onto the conduit and to draw the pipe through the conduit; the amount of lining material being deposited on the conduit being proportional to the volume of the pipe at the squeezing area and independent of the speed of travel of the dispensing means relative to the conduit.

14. Apparatus as claimed in claim 13 wherein the means for squeezing the pipe comprises a pair of squeezing elements.

15. Apparatus as claimed in claim 14 wherein at least one squeezing element comprises a driven roller.

16. Apparatus as claimed in claim 15 wherein the rollers provide means for drawing the pipe through the conduit.

17. Apparatus as claimed in claim 13 wherein the pipe is of substantially uniform cross-sectional area over its length for deposition of lining material on a conduit of substantially uniform cross-sectional area over its length.

18. Apparatus as claimed in claim 13 wherein the cross-sectional area of the pipe is variable over its length in proportion to a change in cross-sectional area of the conduit, the location of increased or reduced cross-sectional area area of the pipe lying at the localized area of the pipe as the nozzle is aligned with the location of the corresponding change in cross-sectional area of the conduit.

19. Apparatus as claimed in claim 13 including means for cleaning the conduit ahead of the dispensing means as the pipe is drawn through the conduit.

20. Apparatus as claimed in claim 19 wherein the means for cleaning the conduit provides the centering means.

21. Apparatus as claimed in claim 19 wherein the cleaning means comprises a brush leading the dispensing means as the pipe is drawn through the conduit.

22. Apparatus as claimed in claim 21 wherein the brush is transversely extendable.

23. Apparatus as claimed in claim 20 wherein the cleaning means comprises a spray device leading the dispensing means as the pipe is drawn through the conduit.

* * * * *